United States Patent [19]

Kassai

[11] Patent Number: 4,577,355
[45] Date of Patent: Mar. 25, 1986

[54] FRAME STRUCTURE FOR BABY CARRIAGE BED

[75] Inventor: Kenzou Kassai, Osaka, Japan

[73] Assignee: Kassai Kabushikikaisha, Osaka, Japan

[21] Appl. No.: 636,850

[22] Filed: Aug. 1, 1984

[30] Foreign Application Priority Data

Aug. 22, 1983 [JP] Japan .................................. 58-153434
May 22, 1984 [JP] Japan .................................. 59-104238

[51] Int. Cl.<sup>4</sup> ........................ B62B 7/06; B62B 7/12; B62B 9/12; A47D 13/02
[52] U.S. Cl. .................................... 5/93 R; 5/99 A; 5/101; 5/102; 280/47.4; 280/643; 280/648
[58] Field of Search ................. 5/99, 101–107, 5/93, 97, 98, 94; 280/47.4, 643, 648, 47.39; 297/118, 433

[56] References Cited

U.S. PATENT DOCUMENTS 3,971,079 7/1976 Fleischer ........................ 5/93 R
4,181,356 1/1980 Fleischer ........................ 5/99 R
4,391,453 7/1983 Glaser ........................... 280/47.4

FOREIGN PATENT DOCUMENTS 472841 10/1937 United Kingdom .............. 5/98 C

Primary Examiner—Alexander Grosz
Attorney, Agent, or Firm—W. G. Fasse; D. H. Kane, Jr.

[57] ABSTRACT

A frame structure for a baby carriage bed is constructed for changing the baby carriage bed into a seat and vice versa. The frame includes a front support member (15) and rear support members (16, 17) for supporting a front bottom portion and a rear bottom portion of a bottom wall of the baby carriage bed respectively. A left side fixed member (11, 18) and a right side fixed member (12, 19) are fixedly positioned on the respective side of the rear portion of the baby carriage bed for providing left and right side surfaces cooperating with the rear bottom portion. The rear support members (16, 17) are mounted across the left side fixed member (11, 18) and the right side fixed member (12, 19). The structure further includes a left sliding member (13, 26) and a right sliding member (14, 27) slidably mounted with respect to the left side fixed member (11, 18) and the right side fixed member (12, 19) respectively. The front support member (15) is mounted across the left sliding member (13, 26) and the right sliding member (14, 27).

13 Claims, 39 Drawing Figures

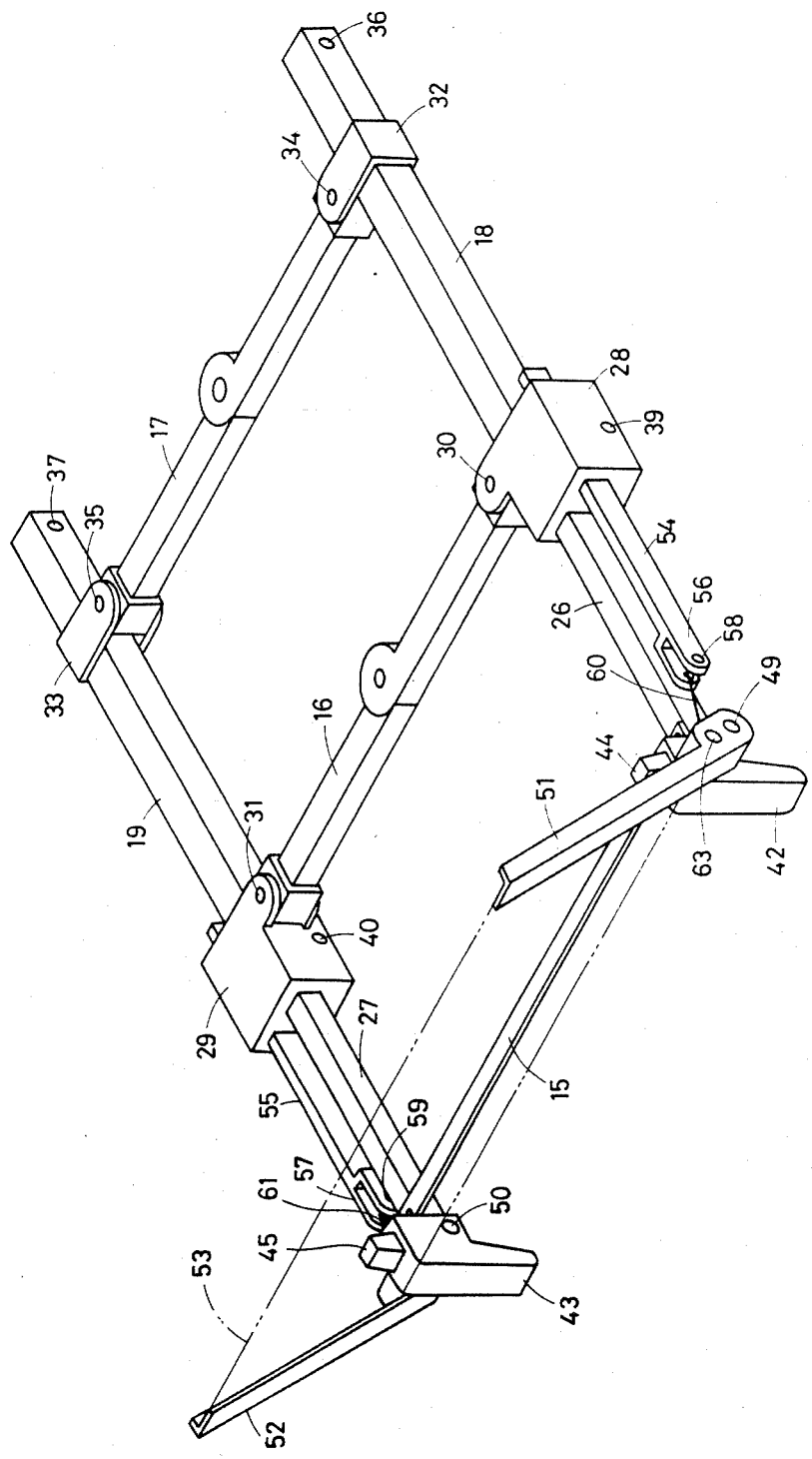

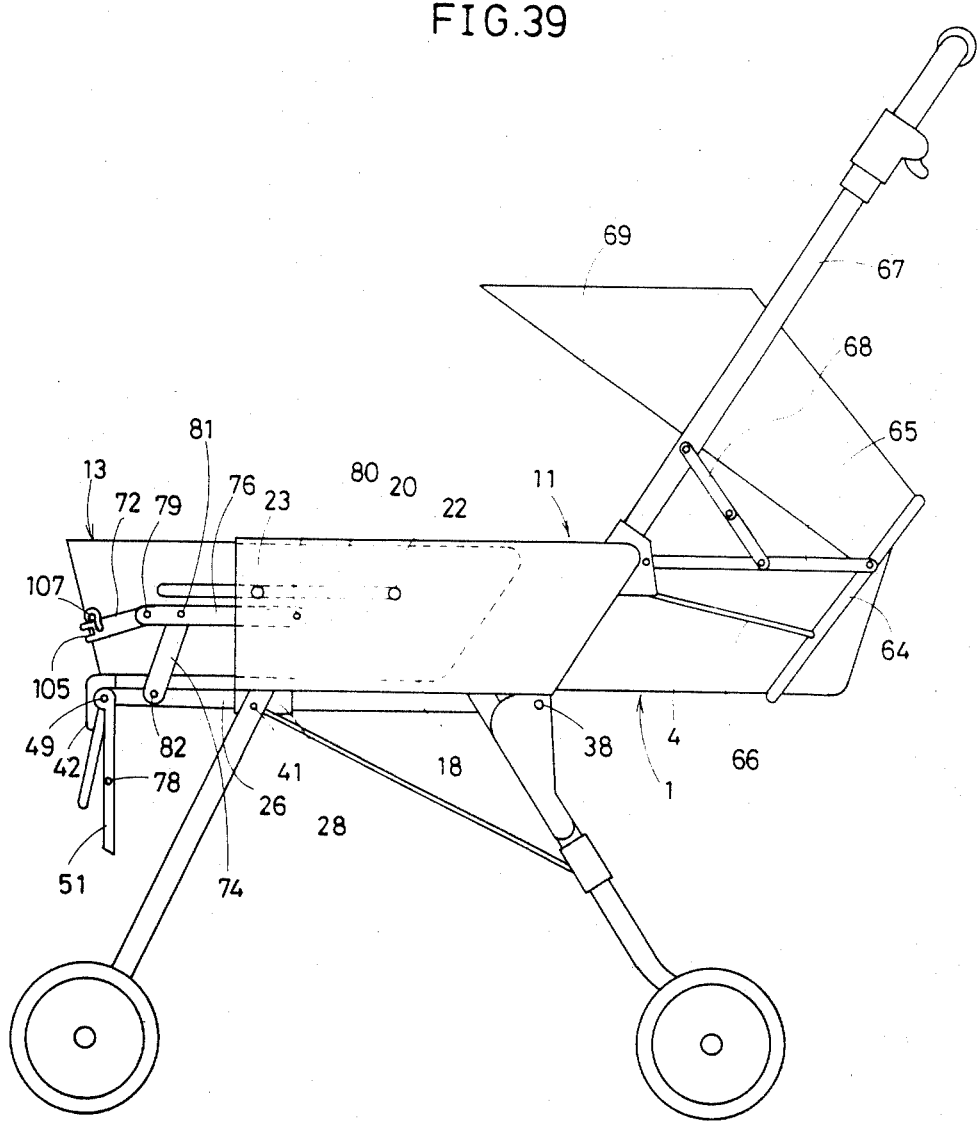

FRAME STRUCTURE FOR BABY CARRIAGE BED

BACKGROUND OF THE INVENTION

1. Field of the Invention

The present invention relates to a frame structure for supporting a baby carriage bed, and more particularly, it relates to a frame structure for a baby carriage bed which is foldable such that a portion for holding a baby in the baby carriage basically forms a bed and is capable of alternately forming a seat when desired.

2. Description of the Prior Art

Originally or at least when the baby carriage was first proposed, the bed portion was of the so-called "box type" in which a baby may comfortably rest in the baby carriage. For babies, therefore, the box type is preferable from the standpoint of their growth and is superior in baby carriage livableness or comfortableness. However, the change of times has gradually modified such baby-centered design concept and placed more importance on the convenience of baby carriages as a means for transporting babies. For example, the seat type is now predominant in baby carriages and, further, because of the use of means of transportation, foldable small-sized baby carriages are most popular. This ia an inevitable consequence of various changes in life style and is one of the needs of the times.

The prior efforts to make baby carriages more convenient for transporting babies, as described above, cannot be denied their importance in developing a new baby carriage. However, it seems necessary to go back to the starting point to think over what construction a baby carriage should have which does not hamper a baby's growth or degrade baby carriage livableness and which is still convenient to use.

SUMMARY OF THE INVENTION

An object of the present invention is to provide a frame structure to a baby carriage bed is to be secured which does not hamper a baby's growth and which does not degrade baby carriage livableness, as described above. According to the frame structure of the present invention, the baby carriage bed is adapted to change its shape into a seat form for convenience of use.

According to the present invention, the form of a baby carriage bed comprising a plurality of walls including at least a bottom wall and a rear wall is adjustable by the user for providing a bed or a seat for a so-called "box type" baby carriage. A front bottom portion forming the front part of the bottom wall of the baby carriage bed is foldable with respect to its rear bottom portion forming the rear part of the bottom wall. The frame structure according to the present invention supports such a baby carriage bed. That is, the frame structure is adapted to enclose the baby carriage bed from both sides while supporting the bottom wall from below. The position of the front bottom portion is changeable between a horizontal position and a downwardly extending position, thereby to change the baby carriage bed between a form suitable as a bed and a form suitable as a seat.

More specifically, the frame structure comprises a front support member and a rear support member for supporting the front bottom portion and the rear bottom portion of the bottom wall of the baby carriage bed from below respectively. The frame structure further includes a left side fixed member and a right side fixed member fixedly positioned on both sides in the rear part of the baby carriage bed for providing left and right side surfaces cooperating with the rear bottom portion. The front support member is mounted across the left and right side fixed members. Further included are a left sliding member and a right sliding member positioned on both sides in the front part of the baby carriage bed. These sliding members are mounted for a forward sliding movement with respect to the left and right side fixed members respectively, thereby providing left and right side surfaces cooperating with the front portion when the same is in a horizontal position. The front support member is mounted across the left and right sliding members. In a preferred embodiment of the present invention, a front wall is rotatably mounted to respective front lower ends of the left and right sliding members. An upward position securing means is provided for securing the front wall in an upwardly raised position along the respective front edges of the left and right side sliding members.

In a further preferred embodiment of the present invention, the upward position securing means is associated with and cooperates with the sliding movement of the left and right sliding members such that the front wall is automatically brought into the upwardly raised position when the left and right sliding members are slid in the forward direction whereby the front portion of the bottom wall of the baby carriage bed is brought into a horizontal position to form a bed.

In another preferred embodiment of the present invention, an upward position releasing means is provided for releasing the upward position securing means with respect to the front wall. Thus, the upward position of the front wall is selectively releasable by the upward position releasing means as needed.

According to the present invention, a baby carriage bed and the frame structure therefor are associated to present a bed or a seat for a baby carriage in a box form. Thus, a baby can comfortably be held in the baby carriage bed with due regard to the growth of the baby and the comfort of the baby. Further, the baby carriage bed can simply be turned from its basic bed form into a seat form while keeping originally provided members related to other members, without requiring any addition of separately prepared members or any removal or separation of members provided originally as parts of the bed or the seat.

That is, the left and right sliding members are simply slid in the forward direction, whereby the members forming the front part of the bed are drawn in the forward direction to desirably bring the baby carriage bed into a bed form, while the front bottom portion forming the front part of the bottom wall of the baby carriage bed can be downwardly positioned by sliding back the left and right sliding members, whereby the baby carriage bed is brought into a seat form. Thus, there is no apprehension of loss of separable parts which could get lost in a conventional baby carriage bed.

Further, in a preferred construction, there may be provided a rotatable front wall and an upward position securing means for securing the front wall in an upwardly raised position to close the front part of the baby carriage bed by a forward sliding movement of the left and right sliding members while opening the front part of the baby carriage bed when the left and right sliding members are slid back and the front wall is downwardly positioned.

In a further preferred construction, an upward position releasing means may be provided to release the front wall from the upwardly raised position as needed when the baby carriage bed is in the bed form, to open the front part of the baby carriage bed. Thus, particularly in summer, the baby carriage bed can be well ventilated to present preferable circumstances for the baby. Further, the entire bed can substantially be lengthened and widened by opening the front part when the baby carriage is in the bed form, thereby to facilitate change of diapers and treatment of the baby, and further to effectively deal with the baby's growth. In other words, since the baby grows taller as days go by, the baby carriage bed might be too narrow, e.g., for a one year and a half old baby if the front part thereof remains closed. Thus, when the front part of the baby carriage bed is opened, the baby can be more comfortably held in the bed. Since security of the baby carriage bed is assured by the members provided on the left and right sides thereof, no trouble will be caused by opening the front part of the baby carriage bed when it is in its bed form.

The above and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a perspective view showing components to be mounted to left and right fixed bars 18 and 19 of the baby carriage as shown in FIG. 1;

FIG. 39 is an illustration similar to FIG. 36, in which a front wall is rotated in the counter-clockwise direction from the position as shown in FIG. 36.

DESCRIPTION OF PREFERRED EXAMPLE EMBODIMENTS AND OF THE BEST MODE OF THE INVENTION

Figure 1:
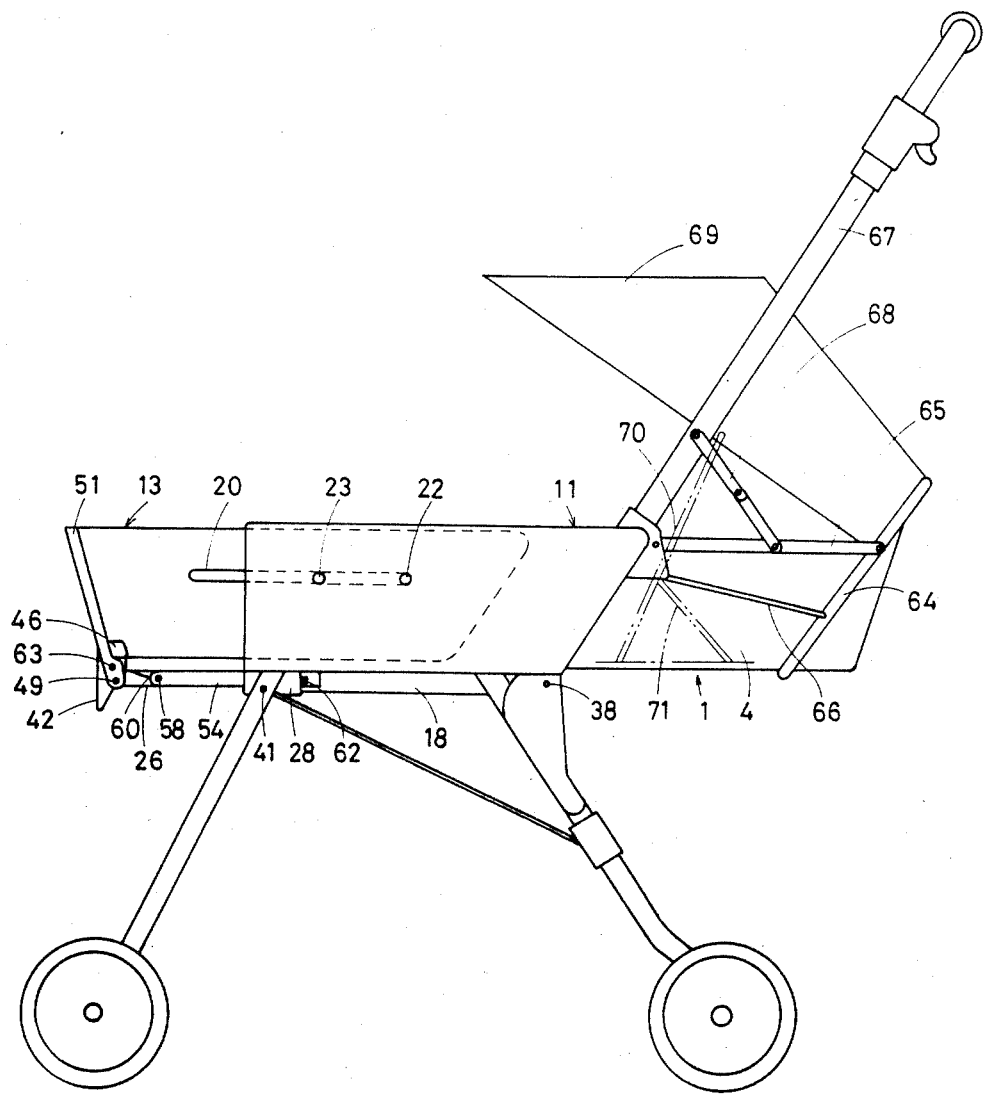
FIG. 1 is a right side elevational view of a baby carriage using a frame structure of the present invention, with a baby carriage bed shown in its basic bed form.
Figure 2:
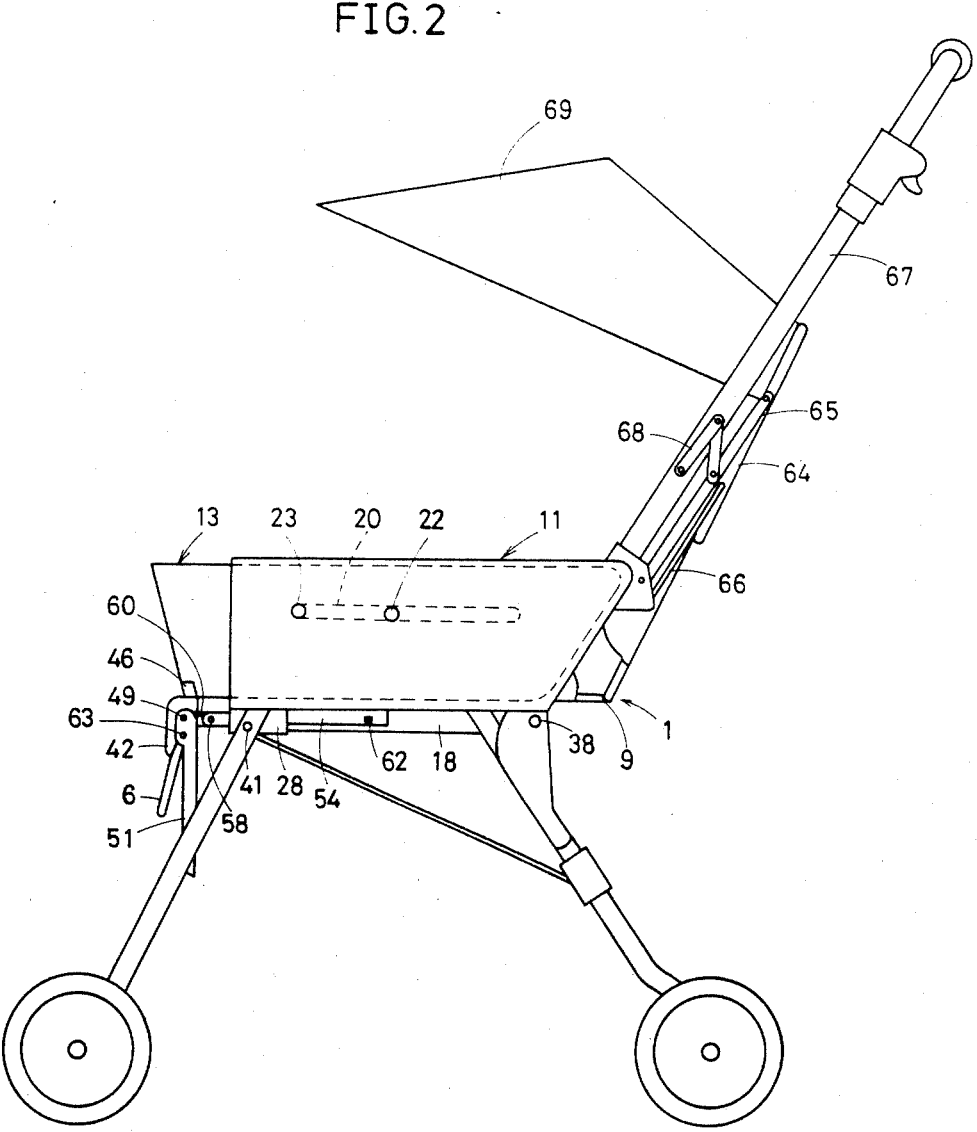
FIG. 2 is an illustration similar to FIG. 1, in which the baby carriage bed is turned into a seat form.
Figure 3:
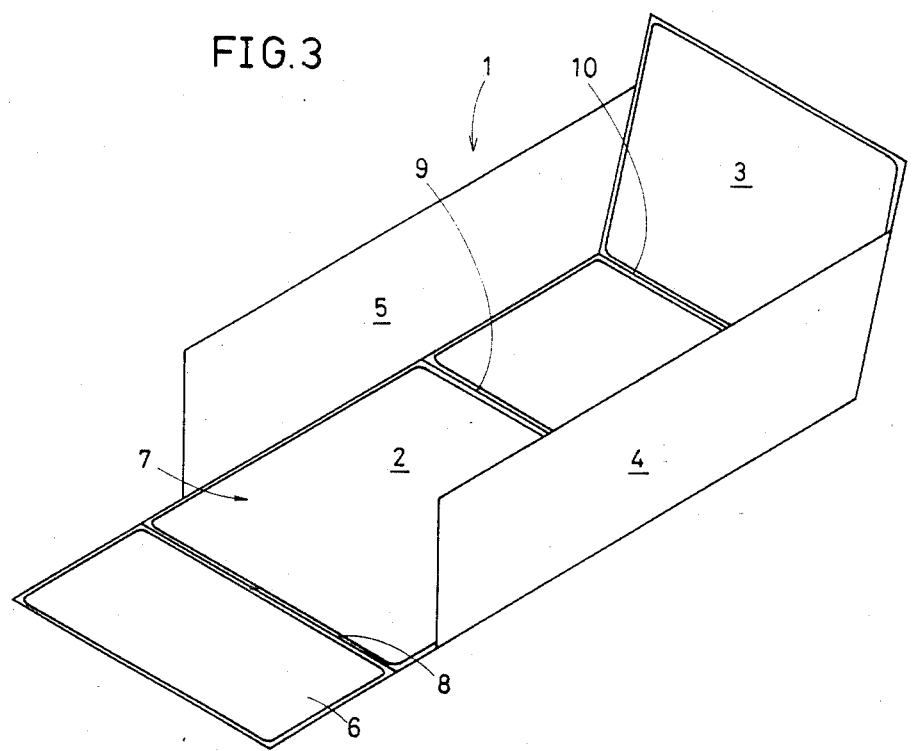
FIG. 3 is a perspective view exclusively showing the baby carriage bed in the form as shown in FIG. 1.

Referring to FIGS. 1 to 4 of the drawings, a baby carriage bed 1 is mounted substantially in a central portion of a baby carriage frame structure. With reference to a form as shown in FIG. 3, the baby carriage bed 1 comprises a bottom wall 2, a rear wall 3, a left side wall 4 and a right side wall 5. These walls 2 to 5 are formed of a suitable fabric or the like such that the flexibility of the material is well utilized in some portions and hard core material is padded in other portions to impart suitable strength or tension.

Referring to FIG. 3, a front bottom portion 6 forming the front part of the bottom wall 2 is padded with hard core material. Also a rear bottom portion 7 forming the rear part of the bottom wall 2 is padded with the hard core material. A folding line 8 is defined between the front and rear bottom portions 6 and 7. The rear bottom portion 7 is divided into front and rear halves which are individually padded with hard core material, and a folding line 9 is defined along the boundary therebetween. The rear wall 3 is also padded with hard core material, and a folding line 10 is defined between the rear wall 3 and the bottom wall 2. The left and right side walls 4 and 5 are not padded with the core material, so that the flexibility of the fabric is well utilized as it is.

Figure 4:
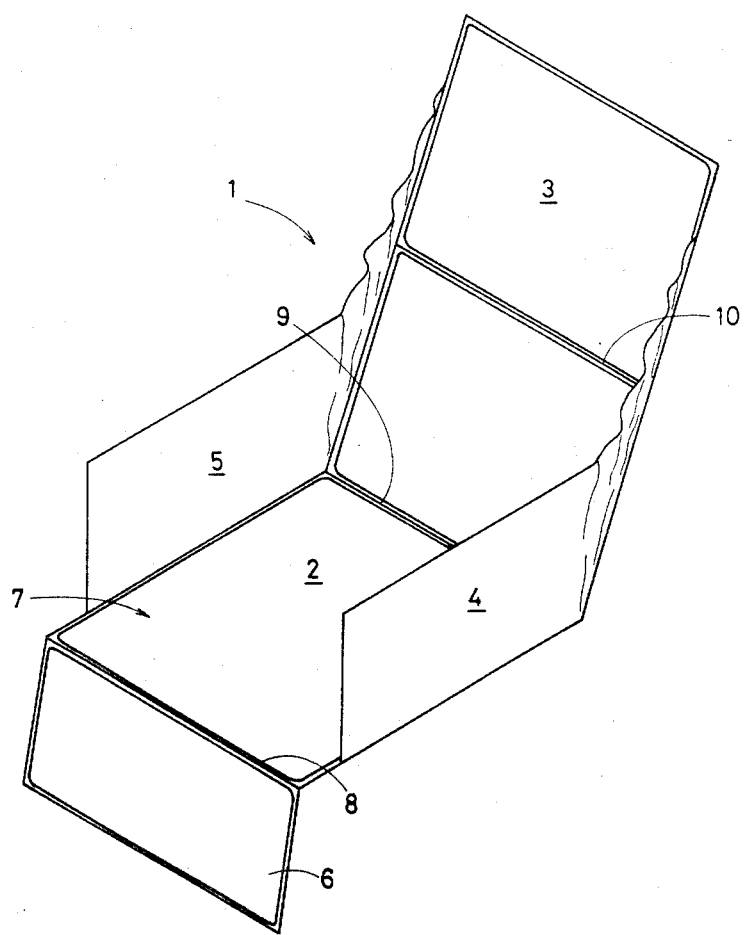
FIG. 4 is a perspective view exclusively showing the baby carriage bed in the form as shown in FIG. 2.

With such a construction, the form of the baby carriage bed 1 can be readily changed from that shown in FIG. 3 to that shown in FIG. 4. That is, the front bottom portion 6 is positioned in a horizontal manner in the form as shown in FIG. 3, and is downwardly bent along the folding line 8 in the form as shown in FIG. 4. Further, the rear part of the bottom portion 7 is upwardly bent along the folding line 9 in the seat form shown in FIG. 4 such that the rear half thereof is in an upwardly raised position substantially in vertical alignment with the rear wall 3 through the folding line 10. The left and right side walls 4 and 5 are appropriately creased thereby to enable such deformation of the rear bottom portion 7 and displacement of the rear wall 3.

The frame structure for a baby carriage bed according to the present invention is adapted to adjust the form of the baby carriage bed 1 which is changed in the aforementioned manner, and further to supply walls required for the baby carriage bed 1.

Figure 5:
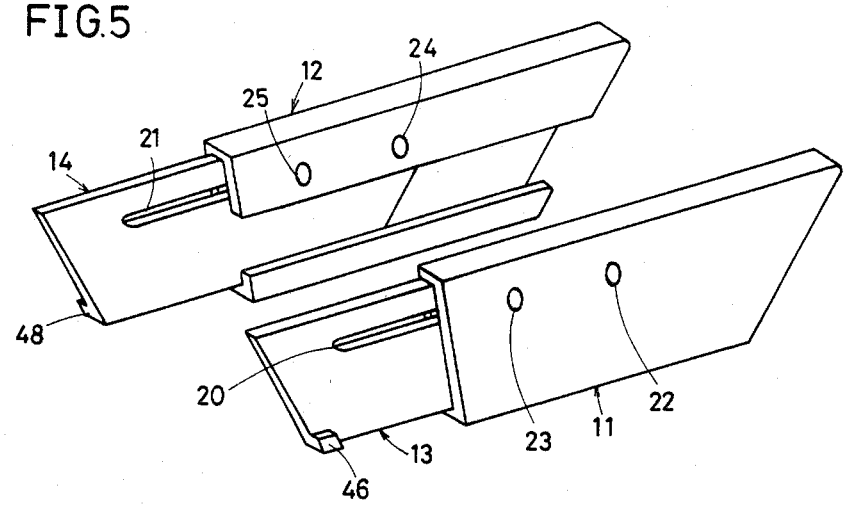
FIG. 5 is a perspective view showing left and right fixed walls 11 and 12 and left and right side sliding walls 13 and 14 of the baby carriage as shown in FIG. 1.

FIG. 5 is a perspective view showing a part of the frame structure, which is formed by a left side fixed wall 11, a right side fixed wall 12 and left and right side sliding walls 13 and 14 mounted to the left and right side fixed walls 11 and 12 respectively in a forwardly slidable manner. FIG. 6 is a perspective view showing another part of the frame structure, which includes a front support member 15 and a pair of rear support members 16 and 17.

Although FIGS. 5 and 6 are drawn to different scales, it is to be noted that the components shown in FIG. 5 are arranged over those shown in FIG. 6. The rear support members 16 and 17 are placed across left and right fixed bars 18 and 19, and the positional relation between the components in FIG. 5 and those shown in FIG. 6 is clear from FIGS. 1 and 2 showing the left fixed bar 18, the left side fixed wall 11 and the left sliding wall 13.

Referring to FIG. 5, the left and right side fixed walls 11 and 12 are located in the respective rear part of the baby carriage bed 1 in a fixed manner with respect to the body of the baby carriage. The left and right side fixed walls 11 and 12 are adapted to extend for defining left and right side surfaces cooperating with the rear bottom portion 7 of the bottom wall 2. In the present embodiment, respective front portions of the left and right side walls 4 and 5 of the baby carriage bed 1 are fixed to the left and right side fixed walls 11 and 12, respectively. The left and right side fixed walls 11 and 12 are both formed in a C shape in section, for defining spaces for receiving the left and right sliding walls 13 and 14 respectively in a slidable manner for a forward and backward sliding movement. The left and right sliding walls 13 and 14 are respectively provided with slots 20 and 21 extending along the front and rear directions while the left and right side fixed walls 11 and 12 are respectively provided with pairs of pins 22, 23, 24 and 25 passing through the slots 20 and 21. The slots 20 and 21 and the pins 22 to 25 are engaged with each other so as to restrict the range of sliding movement of the left and right sliding walls 13 and 14.

Referring to FIG. 6, the left and right fixed bars 18 and 19 are both formed by hollow pipes, to receive left and right sliding rods 26 and 27 respectively for slidably supporting these rods. The front support member 15 is mounted across the left and right sliding rods 26 and 27, and is preferably formed by a flexible belt. One rear support member 16 is retained by brackets 28 and 29 which are mounted to respective front ends of the left and right fixed bars 18 and 19. In other words, both ends of the rear support member 16 are supported by pins 30 and 31 in a rotatable manner with respect to the brackets 28 and 29. The other rear support member 17 is retained by brackets 32 and 33 which are mounted to relatively rearward portions of the left and right fixed bars 18 and 19. That is, both ends of the rear support member 17 are supported by pins 34 and 35 in a rotatable manner with respect to the brackets 32 and 33. The rear support members 16 and 17 are respectively foldable at the central portions thereof. The rear support members 16 and 17 are thus foldably constructed with the front support member 15 formed by the flexible belt in relation to the foldable structure of the baby carriage. That is, in the baby carriage bed according to the present invention, the distance between the left and right fixed bars 18 and 19 is changed by the folding operation thereof, and the front support member 15 is flexibly formed and the rear support members 16 and 17 are foldably constructed to enable such a change in said distance. Also, the baby carriage bed 1 is preferably constructed as foldable structure with folding lines defined between portions padded with the hard core material to allow such folding operation of the baby carriage.

The left and right fixed bars 18 and 19 are provided with holes 36 and 37 respectively in rear end portions thereof for receiving a pin 38 as shown in FIGS. 1 and 2, which pin is engaged with the hole 36. Also the brackets 28 and 29 are provided with holes 39 and 40 respectively in positions for receiving a pin 41 as shown in FIGS. 1 and 2, which pin is engaged with the hole 39.

Downwardly projecting operation knobs 42 and 43 are mounted to front end portions of the left and right sliding rods 26 and 27 respectively. The operation knobs 42 and 43 are provided in upper surfaces thereof with truncated pyramidal projections 44 and 45, the function of which will be explained with reference to FIG. 7 showing the construction of one projection 44.

Figure 7:
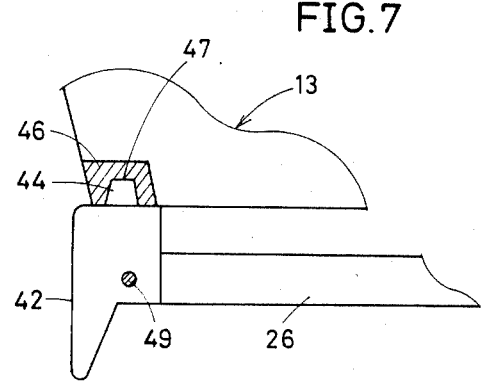
FIG. 7 is an illustration showing an assembly of the left side sliding wall as shown in FIG. 5 and a left sliding rod as shown in FIG. 6.

Referring to FIG. 7, the front lower end of the left sliding side wall 13 is provided with a thick portion 46, which is also shown in FIGS. 1, 2 and 5. A concavity 47 is defined in the lower part of the thick portion 46 for receiving the projection 44, which is fixed to the concavity 47 by a suitable fixing means such as an adhesive agent, whereby the left sliding rod 26 and the left sliding side wall 13 are mechanically integrally connected with each other. The right sliding side wall 14 is also provided with a thick portion 48 as shown in FIG. 5, so that the right sliding wall 14 and the right sliding rod 27 are also mechanically integrally connected with each other by a construction similar to the above.

In the construction described above, the respective sliding side walls 13 and 14 and the sliding rods 26 and 27 mechanically integrally connected therewith may be combined into single members to define a left sliding member and a right sliding member respectively. For example, the left and right sliding rods 26 and 27 may be omitted to provide the left and right sliding members exclusively by the left and right sliding side walls 13 and 14.

Referring again to FIG. 6, a left front wall mounting rod 51 and a right front wall mounting rod 52 are rotatably mounted to the operation knobs 42 and 43 respectively by pins 49 and 50 provided on the operation knobs 42 and 43, so that a front wall 53 is defined between the left and right front wall mounting rods 51 and 52. The front wall 53 is preferably formed by flexible fabric for a reason similar to that for forming the front support member 15 as a flexible belt and for foldably constructing the rear support members 16 and 17. Since the pins 49 and 50 rotatably supporting the front wall 53, are located in the front end portions of the sliding rods 26 and 27, the front wall 53 is rotatably mounted to respective front lower ends of the left and right sliding members.

Outside the left and right sliding rods 26 and 27, there are respectively arranged a left draw rod 54 and a right draw rod 55 such that the left draw rod 54 is retained by the bracket 28 to be slidable in the same direction as the left sliding rod 26 and the right draw rod 55 is retained by the bracket 29 to be slidable in the same direction as the right sliding rod 27. The front ends of the draw rods 54 and 55 are respectively provided with forked portions 56 and 57, so that pins 58 and 59 provided therein are connected with ends of wires 60 and 61.

Figure 8:
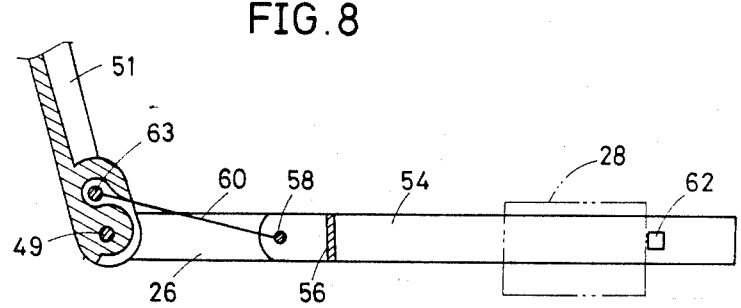
FIG. 8 is an illustration showing a mechanical connection between a left draw rod and a left front wall mounting rod as shown in FIG. 6.
Figure 9:
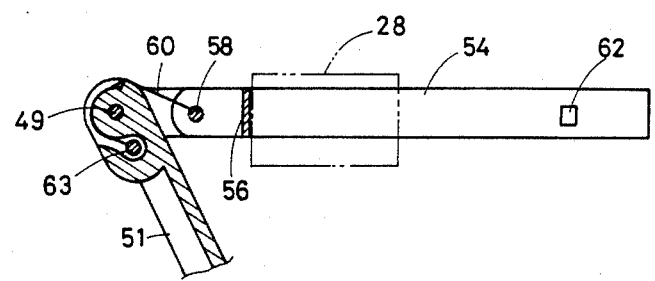
FIG. 9 is an illustration similar to FIG. 8, in which the left draw rod is moved back from the position shown in FIG. 8.
Figure 10:
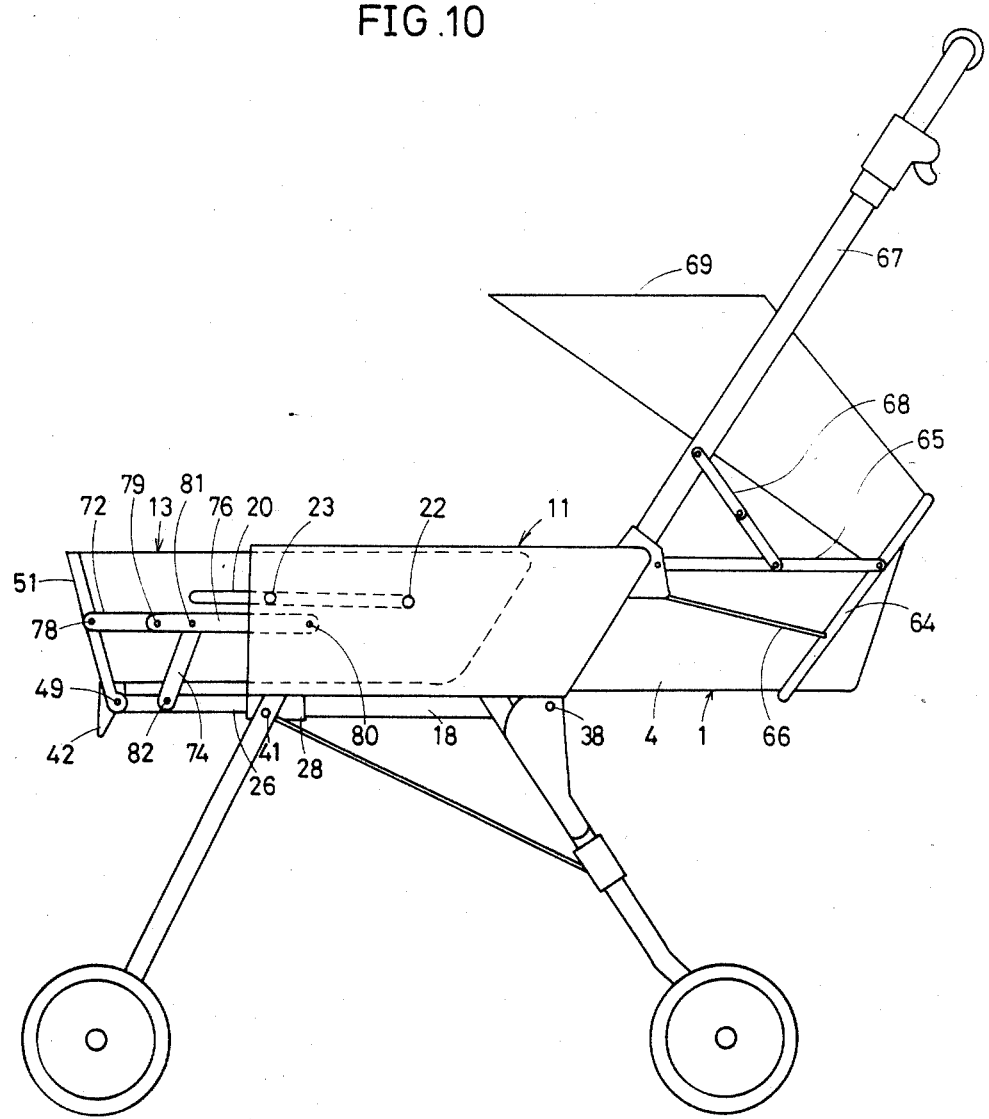
FIG. 10 is a side elevational view of a baby carriage to which another embodiment of the present invention is supplied, with a baby carriage bed shown in a basic bed form.
Figure 11:
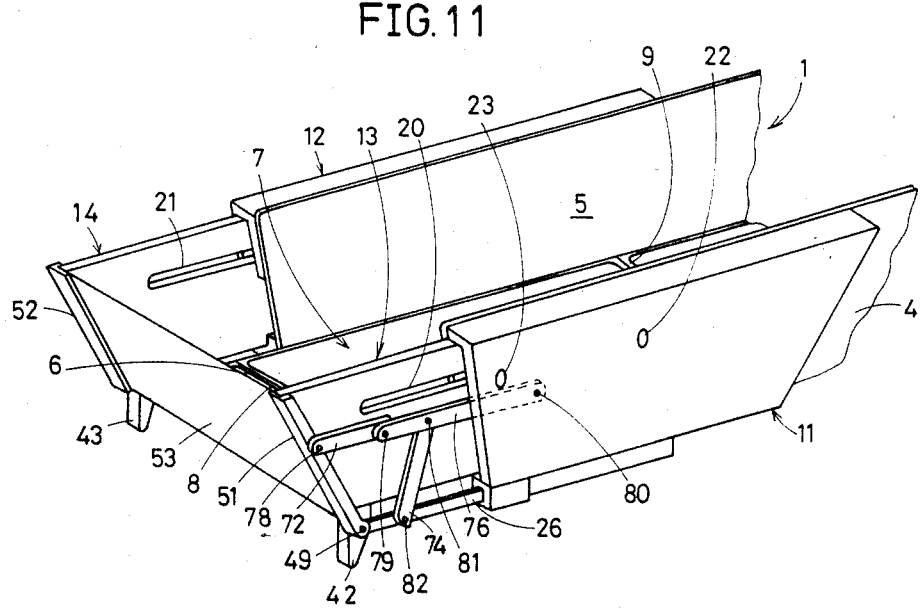
FIG. 11 is a perspective view particularly showing the front part of a seat portion of the baby carriage as shown in FIG. 10.

FIGS. 8 and 9, show the construction of the left draw rod 54 in detail. The left draw rod 54 is provided in its rear portion with a stop member 62, which is brought into contact with the bracket 28 to restrict the range of the frontward sliding movement of the left draw rod 54 as shown in FIG. 8. One end of the wire 60 is connected to the pin 58 as hereinabove described. The other wire end is secured to a pin 63 provided in the left front wall mounting rod 51.

It is to be noted that the right draw rod 55 is constructed similarly to the left draw rod 54, although such a construction is not illustrated.

In the basic bed form of the baby carriage shown in FIG. 1 the bed 1 is in the form as shown in FIG. 3, and the bottom wall 2 is entirely maintained in a horizontal position. In other words, the front bottom portion 6 is supported from below by the front support member 15 extending across the left and right sliding rods 26 and 27 which are drawn frontwardly, to be in the horizontal position. On the other hand, the rear half of the rear bottom portion 7 is supported by a bed rear portion support member 64 held in a horizontal position, by a main lever 65 and an auxiliary lever 66. A reclining adjusting link 68 is connected between the main lever 65 and a push handle 67 of the baby carriage to secure the position of the main lever 65, thereby securing the position of the bed rear portion support member 64. In this condition, the bed rear portion support member 64 supports the rear half of the rear bottom portion 7 to retain the same in the horizontal position. The upper edge of the rear wall 3 is mounted to the upper end of the bed rear portion support member 64. The bed rear portion support member 64 may carry a hood 69.

When the baby carriage bed 1 is in the form as shown in FIG. 3, the bottom wall 2 is enclosed in three directions by the rear wall 3 and the left and right side walls 4 and 5, while the front part thereof is opened. Thus, the forwardly drawn left and right sliding side walls 13 and 14 and the front wall 53 are positioned to form a wall in the front part for forming the baby carriage bed 1 as a complete box. With respect to location of the front wall 53, it is in the state as shown in FIG. 8 when the left and right sliding rods 26 and 27 are drawn forwardly. That is, the left and right sliding rods 26 and 27 are slidingly drawn forwardly followed by the left and right draw rods 54 and 55 pulled by the wires 60 and 61 to be drawn out until such movement is restricted by the stop member 62, while the left and right sliding rods 26 and 27 are sliding further forwardly for bringing the left and right front wall mounting rods 51 and 52, i.e., the front wall 53 into an upwardly raised position by tension of the wires 60 and 61. In this condition, the left and right front wall mounting rods 51 and 52 are respectively in contact with the front edges of the left and right sliding side walls 13 and 14 to be prevented from further rotation, whereby the front wall 53 is secured in the upwardly raised position.

For bringing the baby carriage bed 1 from the form as shown in FIG. 1 into a seat form as shown in FIG. 2, for example, the operation knobs 42 and 43 are manually handled for rearwardly moving the left and right sliding rods 26 and 27, whereby the sliding rods 26 and 27 are brought into positions as shown in FIG. 9. The tension of the wires 60 and 61 is loosened, whereby the left and right front wall mounting rods 51 and 52 lowered downwardly accompanied by a downward movement of the front wall 53, while, simultaneously, the left and right draw rods 54 and 55 are drawn back in the rearward direction. Since the front support member 15 is also rearwardly displaced, the front bottom portion 6 loses its support, to extend downwardly as shown in FIG. 2.

It is to be noted that, in FIG. 9, the left front wall mounting rod 51 is shown rotated further in the counter-clockwise direction from its vertical position, for illustrating that the length of the wire 60 is determined by taking the shown position of the rod 51 into account. For example, when the baby carriage is in a folded condition (not shown), the left draw rod 54 is inclined upwardly in the left-hand direction in FIG. 9. By rotation of the left front wall mounting rod 51 to the angle as shown in FIG. 9, it can be satisfactorily absorbed in the bulk of the baby carriage in its folded condition.

In FIG. 2, the rear portion of the baby carriage bed 1 is upwardly raised to define a backrest of the bed 1 in the seat form. Although such a construction is not necessarily required, the rear half of the rear bottom portion 7 is preferably raised to define the backrest with the rear wall 3 when the front bottom portion 6 is brought to extend downwardly as shown in FIG. 4, to present a further suitable form as a seat. For retaining the baby carriage bed 1 in such a form, the reclining adjusting link 68 is folded to secure the angle of the baby carriage bed 1, whereby the main lever 65 is secured in the upward position. Thus, the bed rear portion support member 64 is upwardly displaced with its position controlled by the auxiliary lever 66 to raise up the rear wall 3, while the rear half of the rear bottom portion 7 is supported from the back. At this time, the rear halves of the left and right side walls 4 and 5 are appropriately creased.

For defining the aforementioned backrest, as shown by two dash-dotted lines in FIG. 1, an upwardly raisable wall member 70 forming a part of the bottom wall 2 may be provided. The wall member 70 is supported in the upward position by a suitable support member 71.

Referring now to FIGS. 10 to 17, there is shown another embodiment of the present invention. Since this embodiment is substantially identical in construction to the one described above excepting means for securing the front wall in the upward position, an explanation is omitted with respect to components similar to those in the aforementioned embodiment, which are indicated by similar names and reference numerals.

In the present embodiment, a foldable link assembly is employed as a means for securing a front wall 53 in an upright position. The foldable link assembly is connected between left and right side fixed walls 11 and 12 partially forming left and right side fixed members respectively and the front wall 53. For such connection, there may be considered various modes, one of which is hereafter described.

The foldable link assembly comprises left and right front link rods 72 and 73, left and right central link rods 74 and 75 and left and right rear link rods 76 and 77. Since the mode of connection of a left foldable link member formed by the left front link rod 72, the left central link rod 74 and the left rear link rod 76 is substantially similar to that of a right foldable link member formed by the right front link rod 73, the right central link rod 75 and the right rear link rod 77 and the left foldable link member appears clearly in the drawings, a detailed explanation is hereafter directed only to the left side.

The front end of the left front link rod 72 is rotatably connected to a left front wall mounting rod 51 through a pin 78, while the rear end thereof is rotatably connected to the front end of the rear link rod 76 by a pin 79. The rear end of the rear link rod 76 in turn is rotatably connected to a left side fixed wall 11 by a pin 80. The upper end of the central link rod 74 is rotatably connected to a central portion of the rear link rod 76 by a pin 81, while the lower end thereof is rotatably connected to the left sliding rod 26 by a pin 82. The front link rods 72 and 73, the central link rods 74 and 75 and the rear link rods 76 and 77 are made of rigid material, and the sizes and arrangement thereof are so determined as to perform the operations described below with reference to FIGS. 13 and 17.

Figure 12:
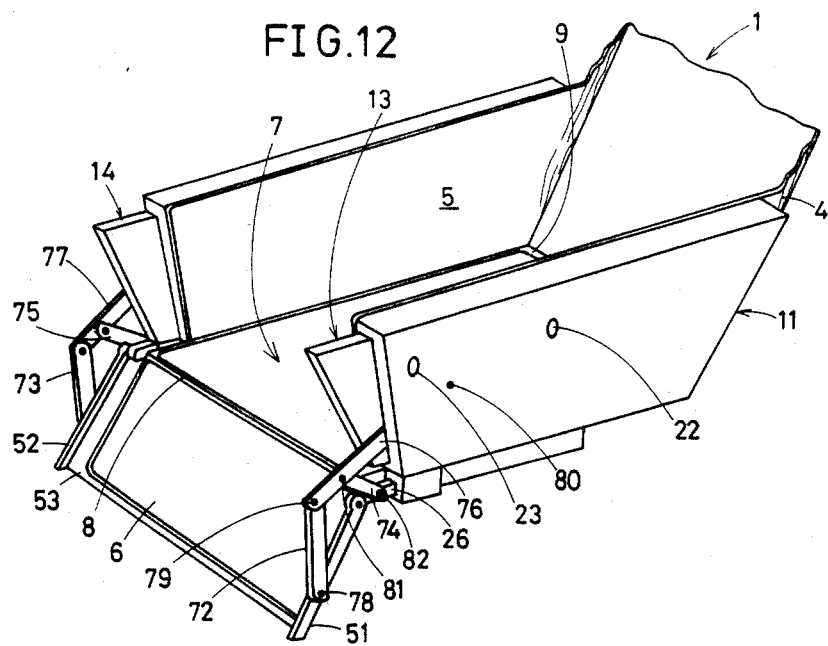
FIG. 12 is a perspective view showing the part appearing in FIG. 11 which is turned into a seat form.
Figure 13:
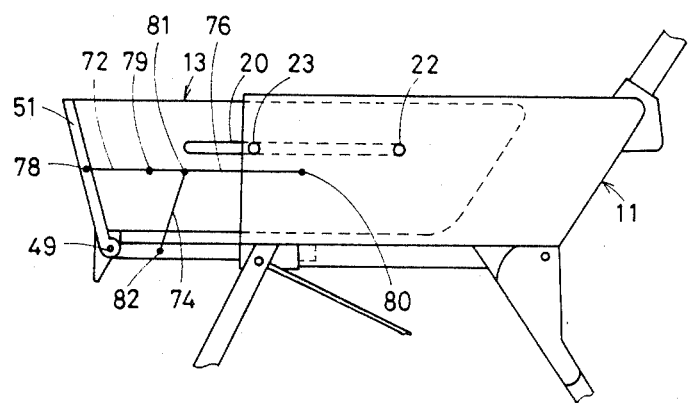
FIGS. 13 to 17 are side elevational views successively showing the steps by which the baby carriage bed as shown in FIGS. 11 and 12, is turned from the basic bed form into the seat form.

In FIG. 13, the left sliding rod 26 and the right sliding rod 27 are pulled into the forwardmost position, and in this condition, the left front wall mounting rods 51, and 52, for mounting a front wall 53 are prevented from downward rotation by the front link rods 72, 73 and the rear link rods 76, 77. When the sliding rods 26 and 27 are drawn rearwardly, as is clear from the sequence of FIGS. 14 to 17, the front link rods 72 and 73 are largely folded with respect to the rear link rods 76 and 77 while the front wall mounting rods 51 and 52 are downwardly rotated about the pins 49 and 50 to downwardly extend in the final state. In this condition, as shown in FIG. 12, a front bottom portion 6 extends downwardly over the front wall 53, so that the baby carriage bed 1 is open at its front part. The central link rods 74 and 75 facilitate the folding of the front link rods 72 and 73 and the rear link rods 76 and 77 or the mutual rotation therof about a pin 79. Therefore, provision of the central link rods 74 and 75 is not necessarily required.

Also in this embodiment, the rear half of a rear bottom portion 7 can be raised as shown in FIG. 12 to define a backrest in a similar manner to that in the aforementioned embodiment.

Figure 14:
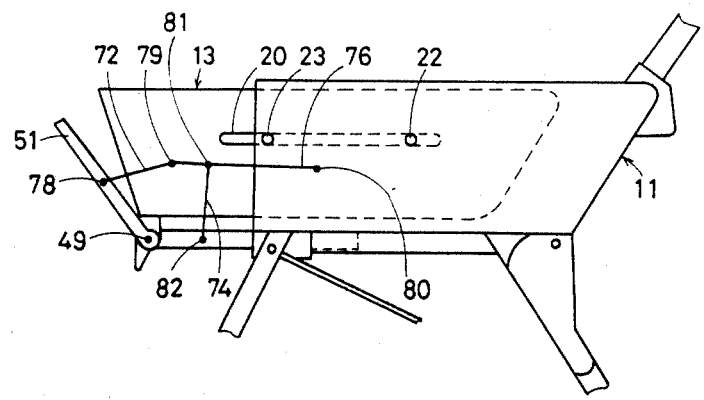
Figure 15:
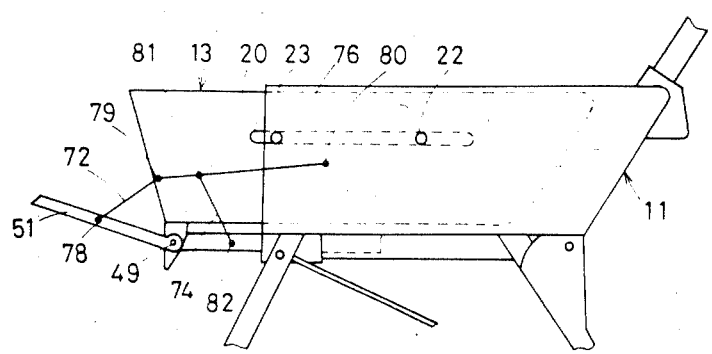
Figure 16:
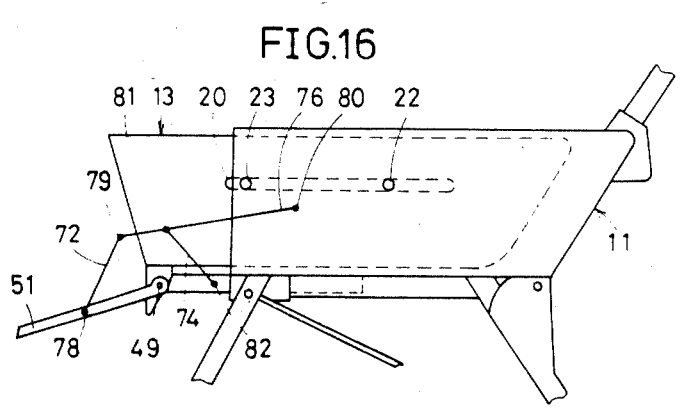
Figure 17:
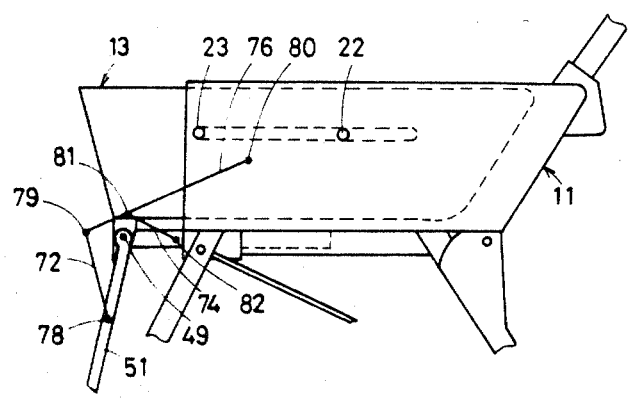

For restoring the form of the baby cariage bed 1 from that shown in FIG. 17 to that in FIG. 13, the left and right sliding rods 26 and 27 are simply drawn in the forward direction, whereby the baby carriage bed 1 is brought into the form as shown in FIG. 13 by the steps shown in the sequence of FIGS. 16, 15 and 14.

Although, in each of the aforementioned embodiments, upward movement of the front wall 53 is enabled by the forward movement of the left sliding member formed by the left sliding side wall 13 and the left sliding rod 26 and the right sliding member formed by the right sliding side wall 14 and the right sliding rod 27, such that the front wall 53 is finally secured in the upward position, such an associated construction is not necessarily required and the front wall 53 may be manually raised to be secured in the upward position by appropriate engaging means.

The embodiment shown in FIGS. 18 to 24 is substantially identical in construction to that shown in FIGS. 1 to 9, excepting the addition of means for releasing the locking of the front wall 53 in an upward position. Thus, an explanation of identical or corresponding components shown in identical reference numerals is omitted. Although the upward position releasing means are provided in left and right positions with respect to wires 60 and 61, only the left-hand components will be described since the right-hand components are substantially identical to the left-hand components.

Figure 21:
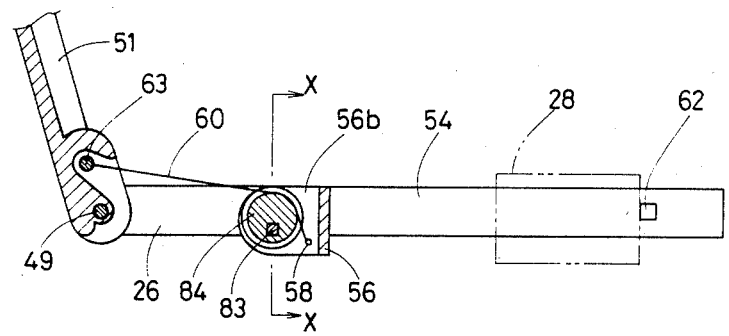
FIG. 21 is an illustration showing a mechanical connection between a left draw rod and a left front wall mounting rod shown in FIG. 20.
Figure 22:
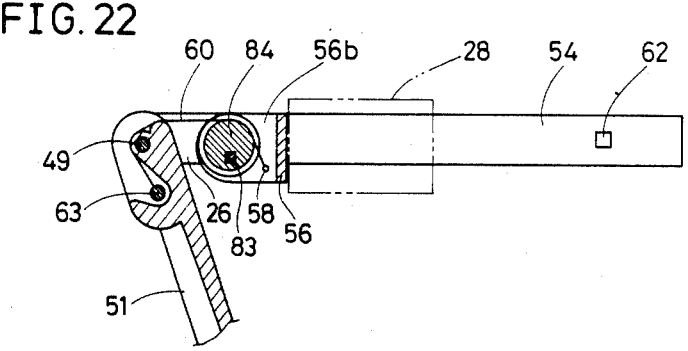
FIG. 22 is an illustration similar to FIG. 21, in which the left draw rod and the left sliding rod are moved back from the positions shown in FIG. 21.
Figure 23:
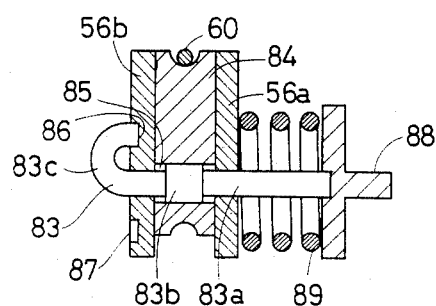
FIG. 23 is a cross-sectional view taken along the line X—X in FIG. 21, illustrating the construction of an eccentric cam mounted to the front end of the left draw rod.

In the present embodiment, as shown in FIGS. 18 to 24, an eccentric cam 84 is rotatably mounted to a forked portion 56 by a shaft 83. The eccentric cam 84 is arranged to be in pressure contact with the wire 60. FIG. 23 is a cross-sectional view taken along the line X—X in FIG. 21, in which the shaft 83 passing through the eccentric cam 84 comprises a left region 83a, an intermediate region 83b and a right region 83c. The left region 83a is circular in section, and is rotatably supported by a left wall 56a of the forked portion 56. The intermediate region 83b is square-shaped in section, and is held in a square-shaped through-hole 85 in the eccentric cam 84. Thus, upon rotation of the shaft 83, the eccentric cam 84 is rotated integrally with the shaft 83. The right region 83c of the shaft 83 is circular in section, and is rotatably supported by a right wall 56b of the forked portion 56. Further, the right region 83c is bent in a U shape, such that the forward end thereof is engaged in one of two engaging concavities 86 and 87 formed in the right wall 56b of the forked portion 56. The engaging concavities 86 and 87 are arranged to be symmetrical with respect to the axis of rotation of the shaft 83. Further, the length of the intermediate region 83b of the shaft 83 is determined to be shorter than that of the through-hole 85 of the eccentric cam 84, whereby the shaft 83 is made slidable in the left and right directions. A handle 88 is fixed to an end of the left region 83a of the shaft 83 while a spring 89 is arranged between the handle 88 and the left wall 56a of the forked portion 56. Thus, the shaft 83 is urged by the spring 89 in such a manner that the region 83c thereof is engaged with the engaging concavity 86 or 87 of the forked portion 56. This engagement is released by pushing the handle 88 to the left in FIG. 23.

Figure 18:
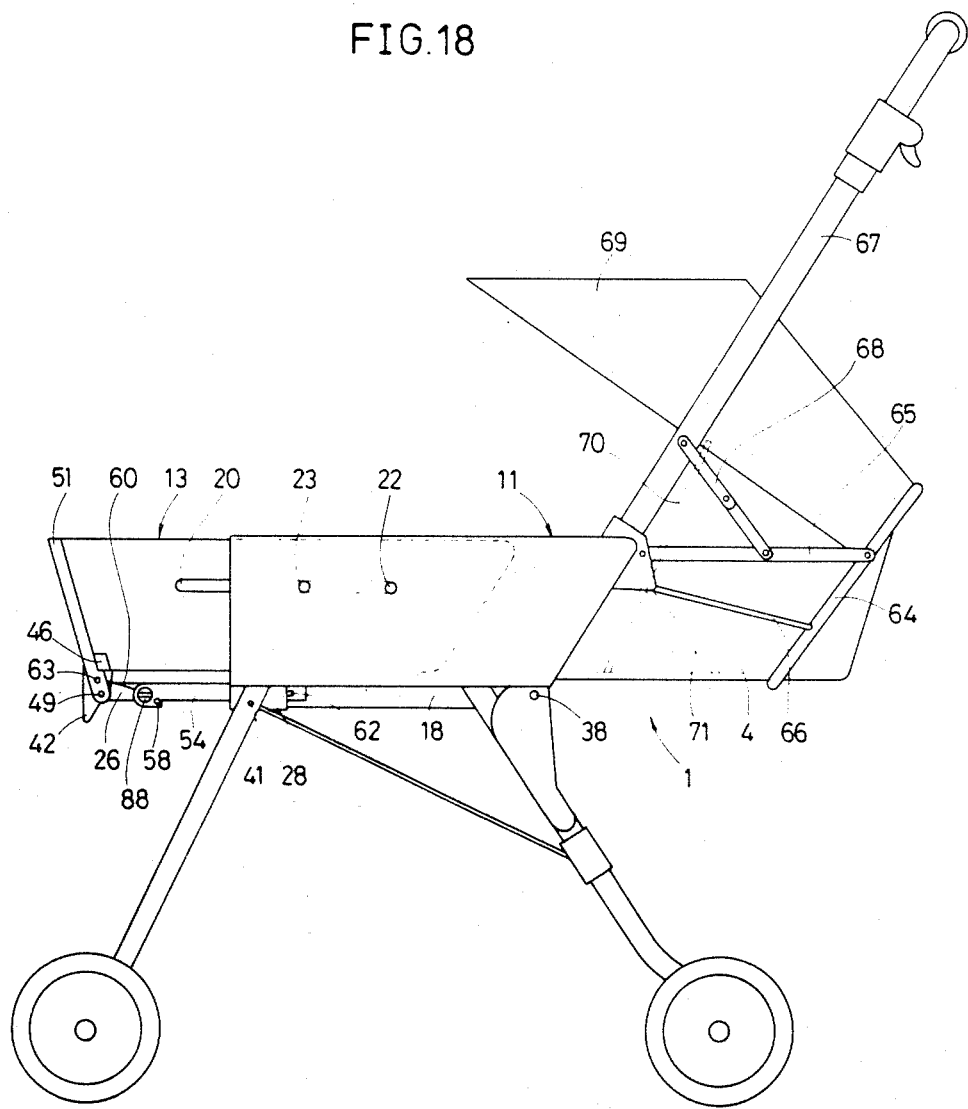
FIG. 18 is a side elevational view of a baby carriage to which still another embodiment of the present invention is applied, with a baby carriage bed shown in a basic bed form.

In FIGS. 18 and 21, the baby carriage bed 1 is shown in the basic form as a bed. In this condition, the tension of the wires 60 and 61 facilitates keeping left and right front wall mounting rods 51 and 52, and hence the front wall 53 in the upright position. The eccentric cam 84 mounted to the forked portions 56 and 57 of left and right draw rods 54 and 55 is secured in such a position that a large-diametrical portion thereof is in pressure contact with the wires 60 and 61. In this condition, the left and right front wall mounting rods 51 and 52 are respectively in contact with front edges of the left and right sliding side walls 13 and 14 to be prevented from further rotation, whereby the front wall 53 is secured in the upward position.

Figure 19:
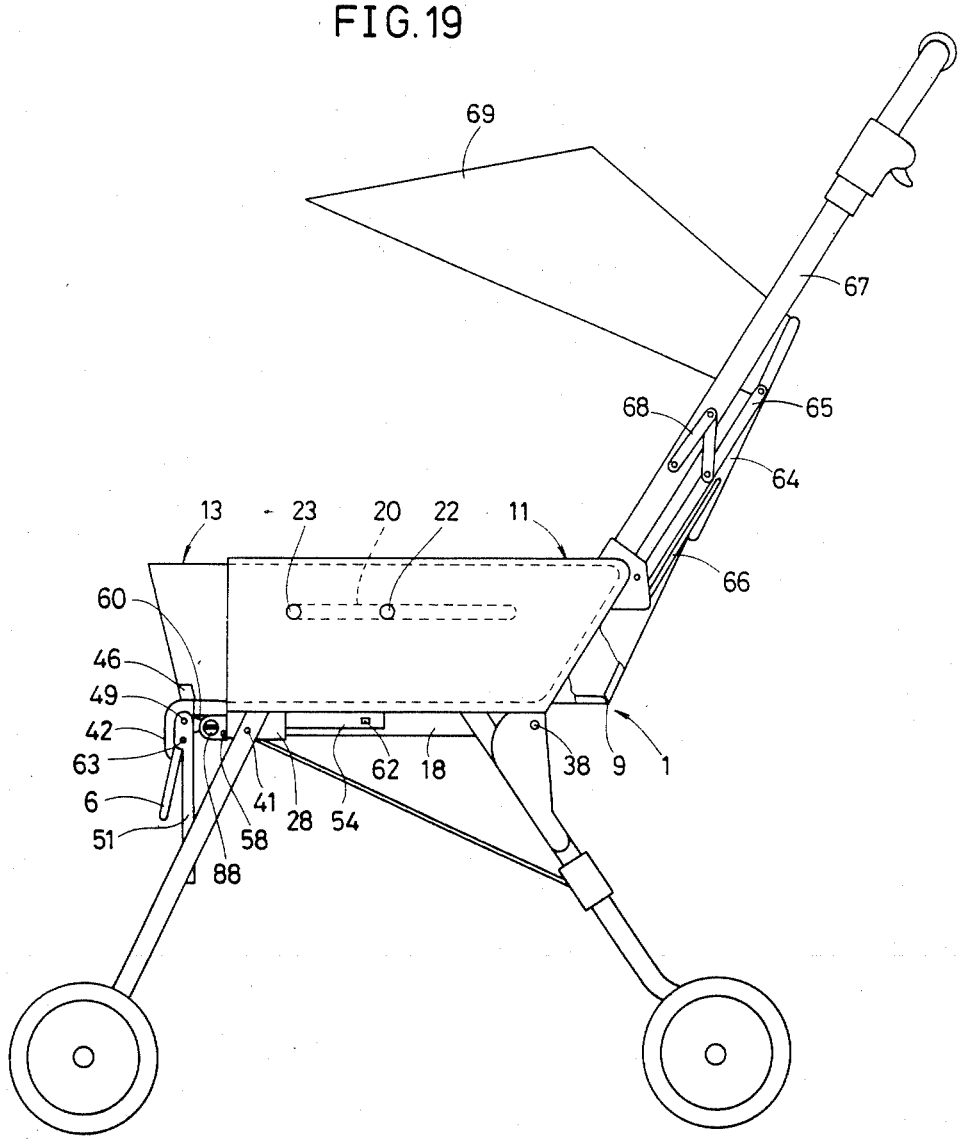
FIG. 19 is an illustration similar to FIG. 18, in which the baby carriage bed is turned into a seat form.
Figure 20:
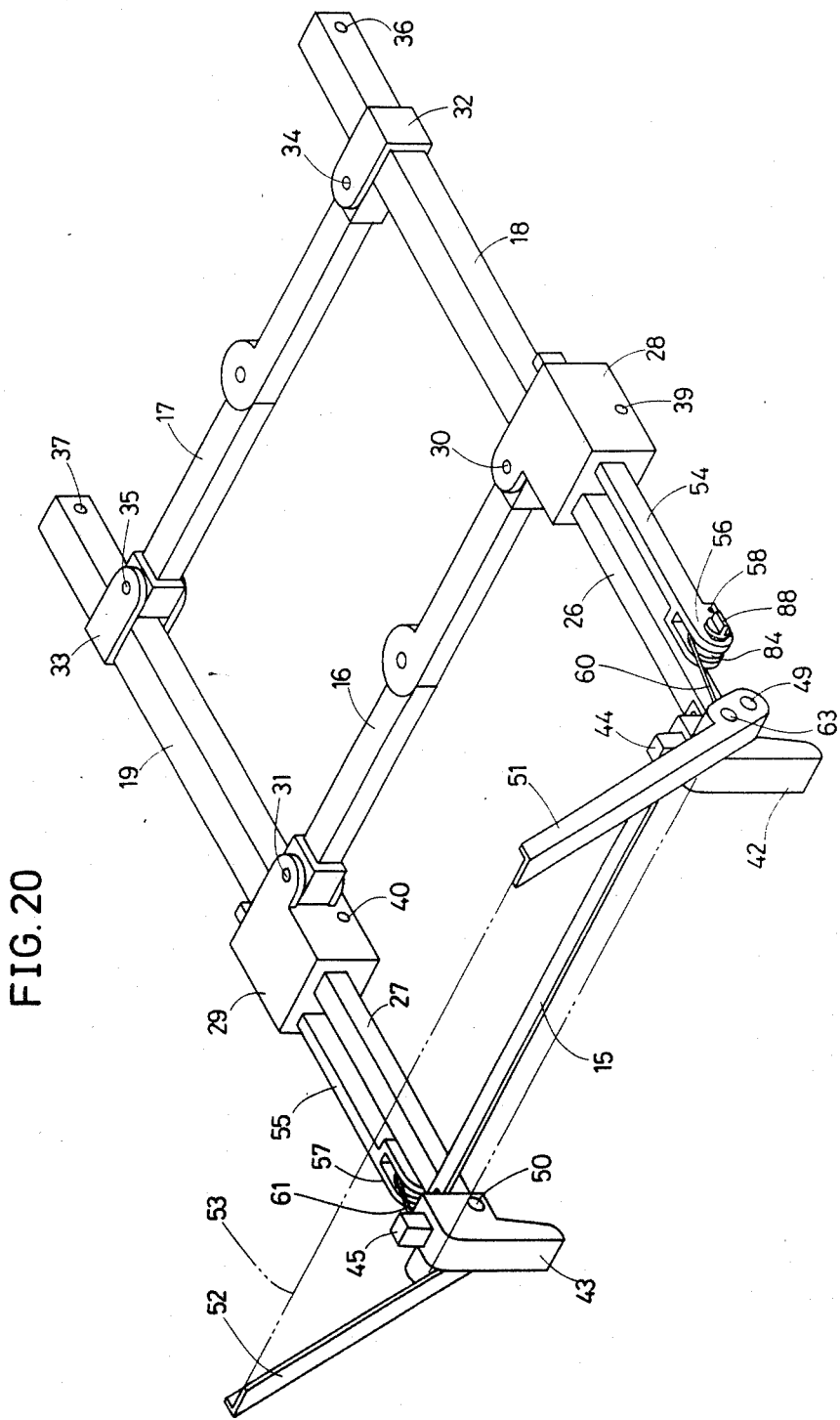
FIG. 20 is a perspective view showing components to be mounted to left and right fixed bars of the baby carriage as shown in FIG. 18.

For bringing the baby carriage bed 1 from the form as shown in FIG. 18 into that in FIG. 19, for example, operation knobs 42 and 43 are manually operated for rearwardly drawing the left and right sliding rods 26 and 27, whereby the baby carriage bed 1 is brought into a form as shown in FIG. 22. The tension of the wires 60 and 61 is loosened and the left and right front wall mounting rods 51 and 52 are moved downwardly followed by a downward movement of the front wall 53, while, simultaneously, the left and right draw rods 54 and 55 are drawn rearwardly. Since a front support member 15 is also rearwardly displaced, the front bottom portion 6 loses its support and hence folds downwardly as shown in FIG. 19.

Figure 24:
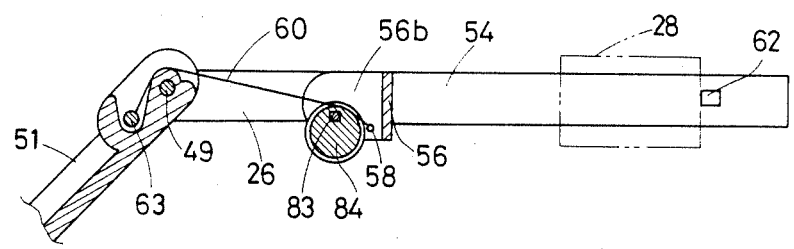
FIG. 24 is an illustration similar to FIG. 21; in which the eccentric cam is rotated by 180° from the position as shown in FIG. 21.

The handle 88 mounted to the left and right draw rods 54 and 55 is rotated for releasing the front wall 53 from the upright position while maintaining the baby carriage bed 1 in the bed form. That is, referring to FIG. 23, the handle 88 is pushed against the spring 89, and is then rotated by 180° so that the right region 83c of the shaft 83 is engaged in the engaging concavity 87, whereby the baby carriage bed 1 is turned from the form as shown in FIG. 21 to that shown in FIG. 24. In the condition shown in FIG. 24, a small-diametrical portion of the eccentric cam 84 is in pressure contact with the wire 60. When the handle 88 is thus rotated from the position shown in FIG. 21, the eccentric cam 84 is also rotated simultaneously with the same. Following the rotation of the eccentric cam 84, the tension of the wire 60 is loosened and the left front wall mounting rod 51, i.e., the front wall 53 is rotated in the counter-clockwise direction in FIG. 21. Thus, in the condition as shown in FIG. 24, the front part of the baby carriage bed 1 is opened. As is clear from the above description, that the eccentric cam 84 serves to release the front wall 53 from the secured upright position by loosening the tension of the wire 60.

Figure 25:
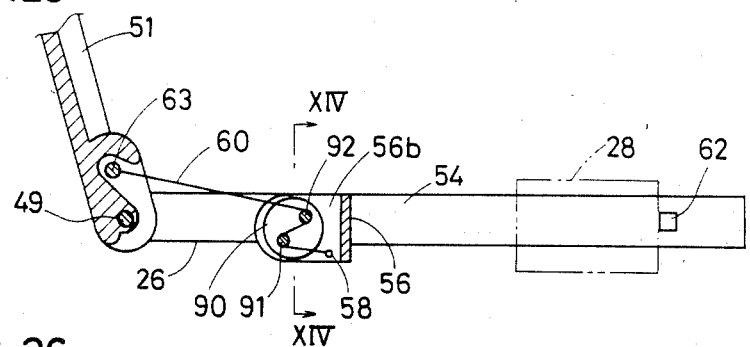
FIG. 25 is an illustration similar to FIG. 21, in which an upward position releasing means comprising a disc and two shafts is substituted for the eccentric cam as shown in FIG. 21.
Figure 26:
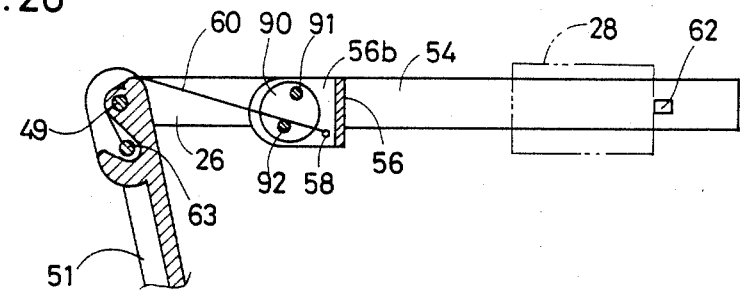
FIG. 26 is an illustration similar to FIG. 25, in which the disc is rotated in the anti-clockwise direction from the position as shown in FIG. 25.

A modified example of the upward position releasing means is shown in FIGS. 25 and 26. In this modification, the upward position releasing means comprises a disc 90 rotatably provided in a forked portion 56 and two shafts 91 and 92 extend upwardly on the disc 90 with an axis of rotation located between the shafts 91, 92. A wire 60 is adapted to pass between the two shafts 91 and 92. In a condition as shown in FIG. 25, the wire 60 is wound around the two shafts 91 and 92 to present a Z shape. When the disc 90 is rotated from this position in the anti-clockwise direction, the tension of the wire 60 is loosened, whereby the baby carriage bed 1 is brought into a form as shown in FIG. 26.

Figure 27:
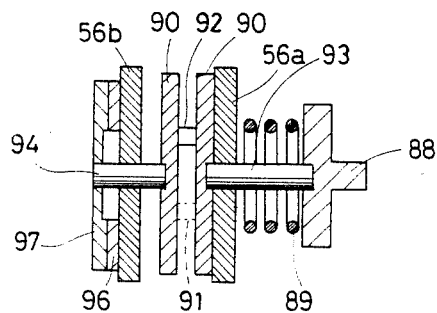
FIG. 27 is a cross-sectional view taken along the line XIV—XIV in FIG. 25, for illustrating the construction of the disc.
Figure 28:
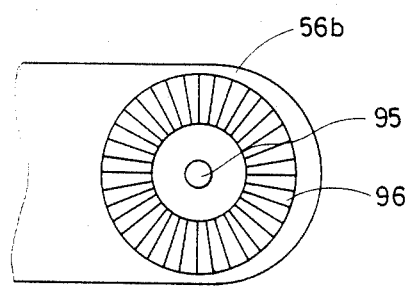
FIG. 28 is a side elevational view showing a right wall of a forked portion provided in the front end of the left draw rod as shown in FIG. 25.

Referring to FIG. 27, the disc 90 has a left shaft 93 which is rotatably supported by the left wall 56a of the forked portion 56 and a right shaft 94 which is rotatably supported by the right wall 56b of the forked portion 56. The handle 88 is fixed to the head of the left shaft 93, and the spring 89 is arranged between the handle 88 and the left wall 56a of the forked portion 56. As shown in FIG. 28, the wall 56b of the forked portion 56 is provided on its visible side surface with a doughnut-shaped teeth assembly 96 which is coaxial with a through-hole 95 for receiving the shaft 94. In correspondence thereto, a brake member 97 having teeth for engagement with the teeth assembly 96 is fixed to the head of the shaft 94. In a normal condition, the brake member 97 and the teeth assembly 96 are urged by the spring 89 to be in engagement with each other, thereby to prevent rotation of the disc 90. For rotating the disc 90, the handle 88 is pushed against the spring 89 to allow rotation of the same. According to the construction as shown in FIG. 27, the angle of rotation of the disc 90 can be finely adjusted, thereby facilitating properly tensioning the respective wire 60 which may have loosened by a long time use. That is, in such a case, the disc 90 is simply rotated further in the clockwise direction from the position as shown in FIG. 25.

Figure 29:
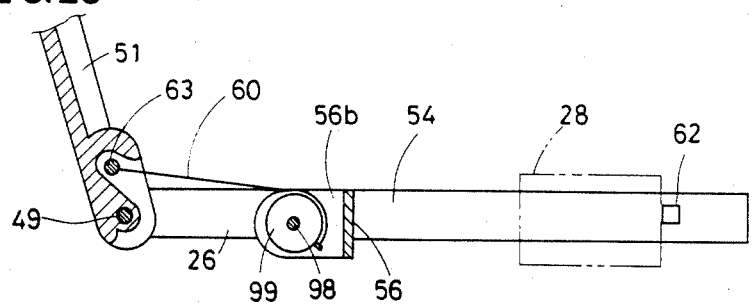
FIG. 29 is an illustration similar to FIG. 21, in which a reel is employed as an upward position releasing means instead of the eccentric cam as shown in FIG. 21.
Figure 30:
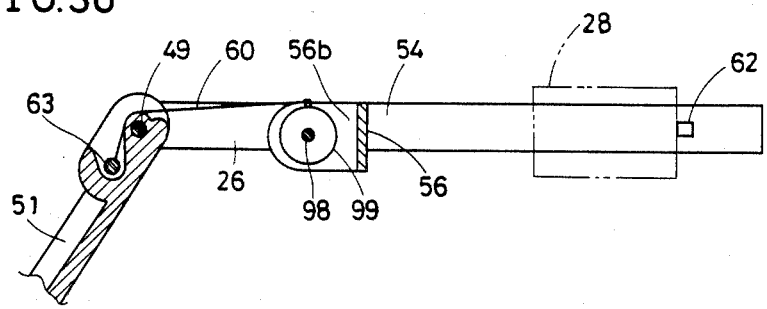
FIG. 30 is an illustration similar to FIG. 29, in which the reel 99 is rotated in the anti-clockwise direction from the position as shown in FIG. 29.

In FIGS. 29 and 30, there is shown still another modified example of the upward position releasing means. In this modification, the upward position releasing means is embodied by a reel 99 which is rotatably provided in a forked mounting 56 of a shaft 98. An end of a wire 60 is fixed to the outer surface of the reel 99. Thus, when the reel 99 is rotated in the counter-clockwise direction from the position as shown in FIG. 29, the tension of the wire 60 is loosened to be brought into the position as shown in FIG. 30.

Figure 31:
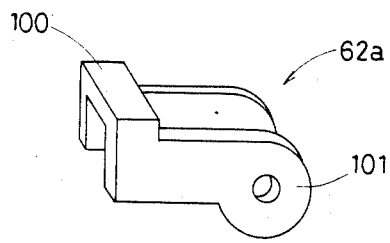
FIG. 31 is a perspective view showing a modification of a stop member as shown in FIG. 21.
Figure 32:
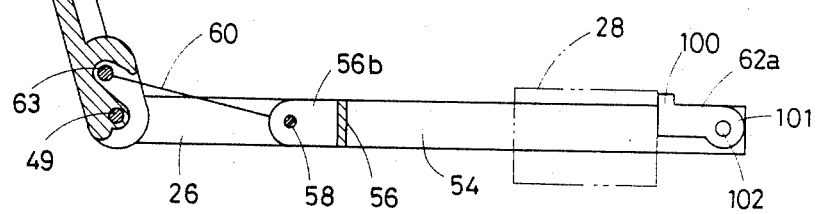
FIG. 32 is an illustration similar to FIG. 21, in which a stop member as shown in FIG. 31 is employed as an upward position releasing means instead of the eccentric cam 84 as shown in FIG. 21.
Figure 33:
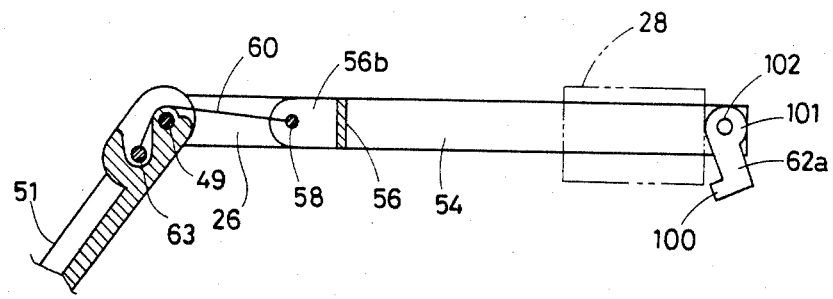
FIG. 33 is an illustration similar to FIG. 32, in which the stop member is rotated in the clockwise direction and a left draw rod is slid in the forward direction from the positions shown in FIG. 32.

Each of the upward position releasing means as shown in FIGS. 21, 25 and 29 is adapted to directly act on the wire 60 to control the tension thereof. However, the tension of the wire 60 can be loosened without exerting any direct action on the same. In FIGS. 31 to 33, there is shown an example of such an upward position releasing means. In this example, a stop member 62a shown in FIG. 31, is employed to restrict forward sliding movement of left and right draw rods 54 and 55. The stop member 62a is elongated in the front and rear directions, and a front end portion 100 thereof is formed in a U shape while a rear end portion 101 thereof is rotatably mounted to the rear end of the left draw rods 54 by a shaft 102. In the condition as shown in FIG. 32, the front end portion 100 of the stop member 62a is in contact with a bracket 28, whereby forward movement of the left draw rod 54 is restricted. By virtue of the tension of the wire 60, a left front wall mounting rod 51, i.e., a front wall 53 is brought into an upward position. When the stop member 62a is rotated in the clockwise direction from this position, a gap is defined between the stop member 62a and the bracket 28. Then the left draw rod 54 is slid forwardly into the gap, whereby the tension of the wire 60 is loosened to achieve the condition shown in FIG. 33.

Figure 34:
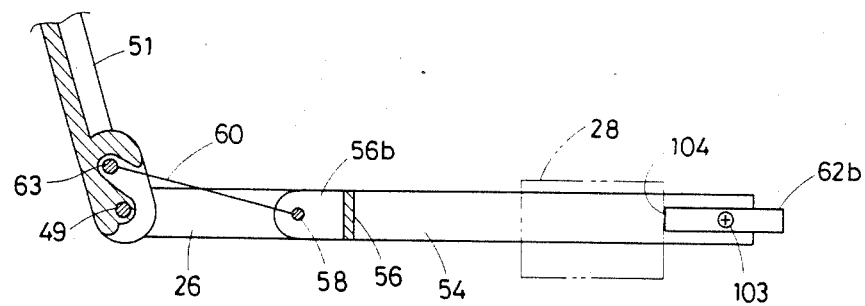
FIG. 34 is an illustration similar to FIG. 21, in which a rectangular parallelepiped stop member is employed as an upward position releasing means instead of the eccentric cam as shown in FIG. 21.
Figure 35:
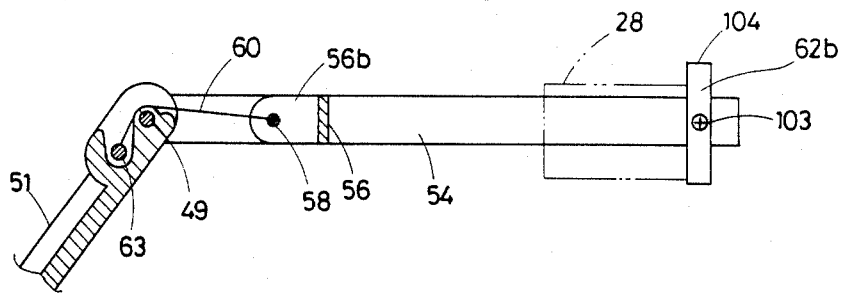
FIG. 35 is an illustration similar to FIG. 34, in which the stop member is rotated by 90° and the left draw rod is slid in the forward direction from the positions as shown in FIG. 34.
Figure 36:
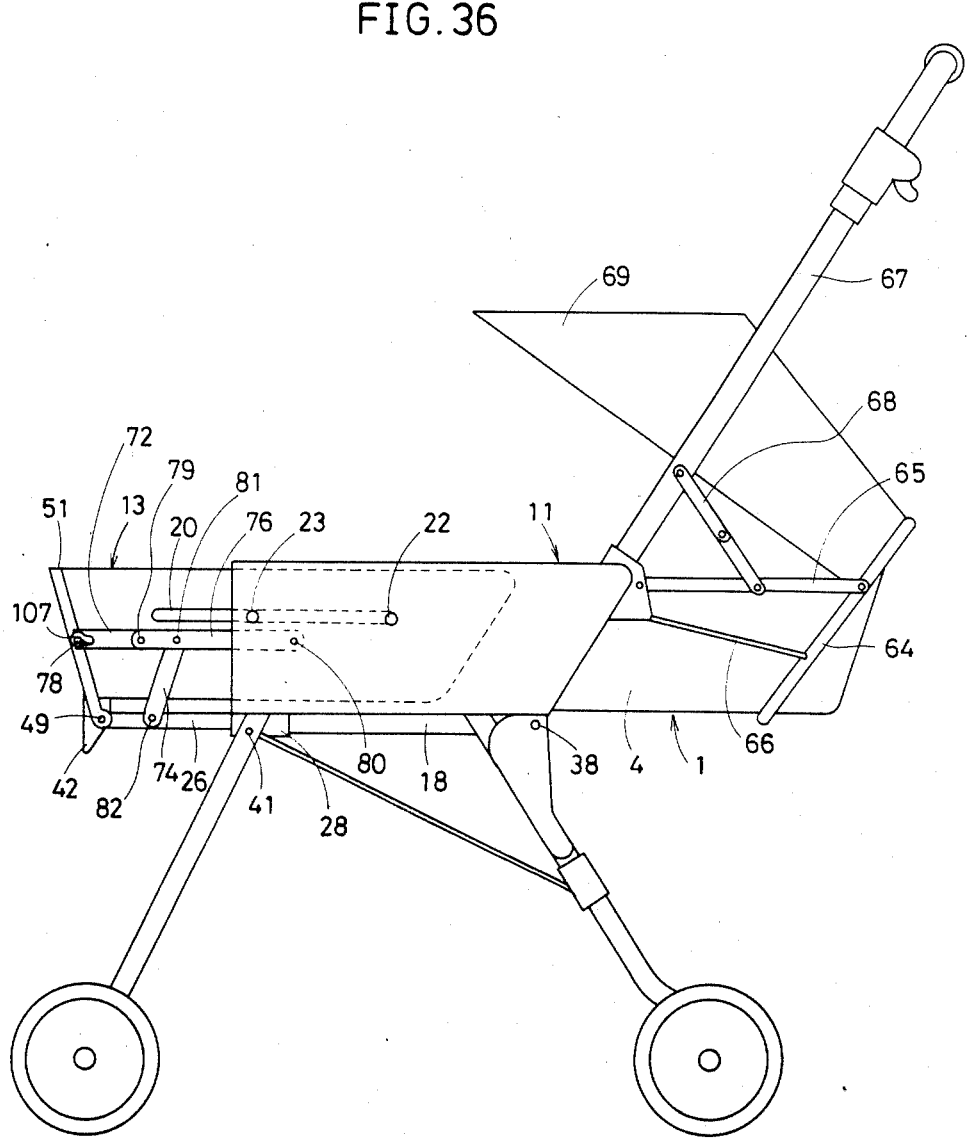
FIG. 36 is a side elevational view of a baby carriage employing a further embodiment of the present invention, with a baby carriage bed shown in a basic bed form.

FIGS. 34 and 35 show a further modified example of the upward position releasing means. Also in this modification, a rectangular parallelepiped stop member 62b elongated in the front and rear directions is employed for restricting the forward sliding movement of a left draw rod 54. The stop member 62b is mounted to the rear end portion of the left draw rod 54 by a screw 103. In the state as shown in FIG. 34, a front end surface 104 of the stop member 62b is in contact with a bracket 28 for restricting the forward movement of the left draw rod 54. When, in this position, the screw 103 is loosened to rotate the stop member 62b by 90°, a gap is defined between the stop member 62b and the bracket 28. Then the left draw rod 54 is further slid in the forward direction from the position as shown in FIG. 34 into the gap, whereby the tension of the wire 60 is loosened to achieve the condition shown in FIG. 35.

In FIGS. 36 to 39, there is shown still another embodiment of the present invention, which is substantially identical to the embodiment as shown in FIGS. 10 to 17, except for the addition of substantially identical upward position releasing means. Only one upward position releasing means will be described.

Figure 37:
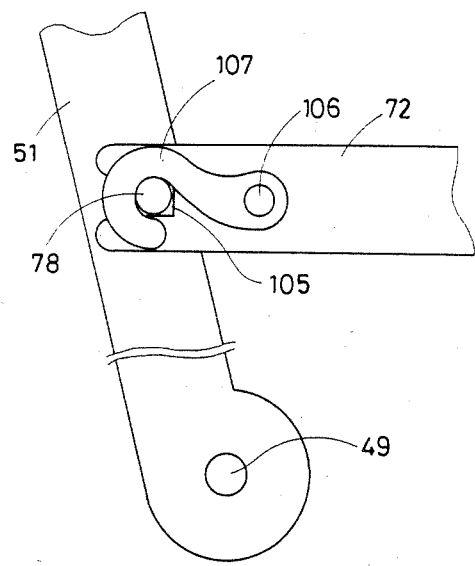
FIG. 37 is an enlarged side elevational view showing the connection between a left front wall mounting rod and a front link rod.
Figure 38:
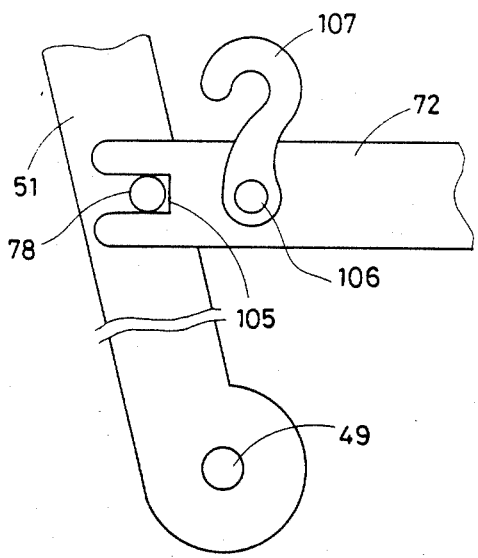
FIG. 38 is an illustration similar to FIG. 37, in which a hook is rotated in the clockwise direction from the position shown in FIG. 37.

The upward position releasing means in the embodiment as shown in FIGS. 36 to 39 comprises a pin 78 for connecting left and right front wall mounting rods 51 and 52 and left and right front link rods 72 and 73 with each other. In FIGS. 37 and 38, there is shown a connecting portion between the left front wall mounting rod 51 and the front link rod 72 in an enlarged manner. In the present embodiment, the upward position releasing means comprises an engaging concavity 105 formed in the front end of the front link rod 72 and a hook 107 rotatably mounted to the front link rod 72 through a pin 106 in the vicinity of the engaging concavity 105. The engaging concavity 105 is adapted to engage the pin 78 provided on the left front wall mounting rod 51. The hook 107 is formed of a flexible material. For connecting the left front wall mounting rod 51 and the front link rod 72 with each other. First, the concavity 105 engages the pin 78 as shown in FIG. 38. Then the hook 107 is rotated in the counter-clockwise direction so that the forward end of the hook 107 is brought into contact with the pin 78 to stop the rotation thereof. However, since the hook 107 has a certain flexibility, further counter-clockwise rotation with sufficient force for causing the hook 107 to engage the pin 78 as shown in FIG. 37. When the front part of a baby carriage bed 1 being in the bed form is to be opened, the hook 107 is disengaged from the pin 78 and the left front wall mounting rod 51 is rotated in the counter-clockwise direction, whereby a state as shown in FIG. 39 is obtained.

The aforementioned upward position releasing means has been constructed to release the connection between the front link rod 72 and the left front wall mounting rod 51, i.e., the front wall 53. In a modification, however, the means may be adapted to release the connection between the front link rod 72 and a rear link rod 76 or that between the rear link rod 76 and a left side fixed wall 11.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a frame structure for a baby carriage bed (1), said bed having at least a bottom wall (2) and a rear wall (3), said front bottom wall (2) having a front bottom portion (6) and a rear bottom portion (7), said front bottom portion (6) being foldable with respect to said rear bottom portion (7), said frame structure enclosing said baby carriage bed (1) on both sides and supporting said baby carriage bed under said bottom wall (2), said front bottom portion (6) being movable between a horizontal position and a downwardly extending position for changing said baby carriage bed (1) between a form suitable as a bed and a form suitable as a seat, the improvement wherein said frame structure comprises a front support member (15) and rear support members (16, 17) for supporting said front bottom portion (6) and said rear bottom portion (7) of said bottom wall (2) respectively; a left side fixed member (11, 18) and a right side fixed member (12, 19) fixedly positioned on both sides of a rear portion of said baby carriage bed (1) for providing left and right side surfaces cooperating with said rear bottom portion (7), said rear support members (16, 17) being mounted across said left side fixed member (11, 18) and said right side fixed member (12, 19); a left sliding member (13, 26) and a right sliding member (14, 27) positioned on both sides of a front part of said baby carriage bed (1), and means mounting said left and right sliding members for a forward and backward sliding movement relative to said left side fixed member (11, 18) and relative to said right side fixed member (12,19) respectively for providing left and right side surfaces cooperating with said front bottom portion (6) when said front bottom portion (6) is in a horizontal position, said front support member (15) being mounted across said left sliding member (13, 26) and across said right sliding member (14, 27).

2. The frame structure for a baby carriage bed in accordance with claim 1, further comprising a front wall (53) rotatably mounted to respective front lower ends of said left sliding member (13, 26) and of said right sliding member (14, 27), and an upward position securing means (54, 55, 60, 61, 62, 72, 73, 76, 77) for securing an upward position of said front wall (53) upwardly raised along respective front edges of said left sliding member (13, 26) and of said right sliding member (14, 27).

3. The frame structure for a baby carriage bed in accordance with claim 2, wherein said upward position securing means (54, 55, 60, 61, 62, 72, 73, 76, 77) comprise frontwardly and rearwardly slidable draw rods (54, 55), a stop member (62) for restricting a frontward sliding movement of said draw rods (54, 55) and wires (60, 61) connected between said draw rods (54, 55) and said front wall (53), such that said left sliding member (13, 26) and said right sliding member (14, 27) are slid in a forward direction whereby said draw rods (54, 55) are pulled out by said wires (60, 61) till the movement is restricted by said stop member (62), whereby said left sliding member (13, 26) and said right sliding member (14, 27) are further slidable in said forward direction for bringing said front wall (53) into an upwardly raised position by tension of said wires (60, 61).

4. The frame structure for a baby carriage bed in accordance with claim 2, wherein
said upward position securing means (54, 55, 60, 61, 62, 72, 73, 76, 77) comprise foldable links (72, 73, 76, 77) connected between said left side fixed member (11, 18) as well as said right side fixed member (12, 19) and said front wall (53).

5. The frame structure for a baby carriage bed in accordance with claim 2, wherein
said frame structure further comprises upward position releasing means (84, 90, 91, 92, 99, 62a, 62b, 107) for releasing said upward position securing means (54, 55, 60, 61, 62, 72, 73, 76, 77) with respect to said front wall (53).

6. The frame structure for a baby carriage bed in accordance with claim 5, wherein said upward position securing means (54, 55, 60, 61, 62, 72, 73, 76, 77) comprise frontwardly and rearwardly slidable draw rods (54, 55), a stop member (62, 62a, 62b) for restricting a forward sliding movement of said draw rods (54, 55) and wires (60, 61) connected between said draw rods (54, 55) and said front wall (53), such that said left sliding member (13, 26) and said right sliding member (14, 27) are slid in the forward direction whereby said draw rods (54, 55) are pulled out by said wires (60, 61) till the movement is restricted by said stop member (62, 62a, 62b), whereby said left sliding member (13, 26) and said right sliding member (14, 27) are further slidable in said forward direction for bringing said front wall (53) into an upwardly raised position by tension of said wires (60, 61), and wherein said upward position releasing means (84, 90, 91, 92, 99, 62a, 62b, and 107) releases said upward position securing means (54, 55, 60, 61, 62, 72, 73, 76, 77) with respect to said front wall (53) by loosening said tension of said wires (60, 61).

7. The frame structure for a baby carriage bed in accordance with claim 6, wherein said upward position releasing means (84, 90, 91, 92, 99, 62a, 62b, 107) comprises a rotatably mounted disc (90) and two shafts (91, 92) extending upwardly on said disk (90) in such positions that an axis of rotation extends between said two shafts, said wires (60, 61) being adapted to pass between said two shafts (91, 92).

8. The frame structure for a baby carriage bed in accordance with claim 6, wherein said upward position releasing means (84, 90, 91, 92, 99, 62a, 62b, 107) comprise a rotatable reel (99) having ends of said wires (60, 61) fixed to its outer surface.

9. The frame structure for a baby carriage bed in accordance with claim 6, wherein said stop member (62, 62a, 62b) is arranged in a displaceable manner to change the position of the stop member for restricting said forward sliding movement of said draw rods (54, 55), whereby said stop member (62a, 62b) is serving also as said upward position releasing means.

10. The frame structure for a baby carriage bed in accordance with claim 5, wherein
said upward position releasing means (84, 90, 91, 92, 99, 62a, 62b, 107) comprise an eccentric cam (84) arranged to be in pressure contact with said wires (60, 61).

11. The frame structure for a baby carriage bed in accordance with claim 5, wherein said upward position securing means (54, 55, 60, 61, 62, 72, 73, 76, 77) comprises foldable links (72, 73, 76, 77) connected between said left side fixed member (11, 18) and said right side fixed member (12, 19) and said front wall (53), and wherein said upward position releasing means (84, 90, 91, 92, 99, 62a, 62b, 107) is arranged for releasing said connection between said left side fixed member (11, 18) and said right side fixed member (12, 19) and said front wall (53).

12. The frame structure for a baby carriage bed in accordance with claim 11, wherein said upward position releasing means (84, 90, 91, 92, 99, 62a, 62b, 107) is arranged for releasing said connection between said foldable links (72, 73, 76, 77) and said front wall (53).

13. The frame structure for a baby carriage bed in accordance with claim 1, wherein said left sliding member (13, 26) and said right sliding member (14, 27) respectively comprise sliding walls (13, 14) and sliding rods (26, 27) positioned under said sliding walls (13, 14).

* * * * *